(No Model.) 9 Sheets—Sheet 1.
R. & J. F. HELM & J. R. ROWLANDS.
MAILING MACHINE.
No. 556,747. Patented Mar. 24, 1896.

WITNESSES:

INVENTORS:
Ralph Helm
John F. Helm
and John R. Rowlands
By E. Laass
Their ATTORNEY (No Model.) 9 Sheets—Sheet 2.

R. & J. F. HELM & J. R. ROWLANDS.
MAILING MACHINE.

No. 556,747. Patented Mar. 24, 1896.

WITNESSES:
C. E. Tomlinson
C. L. Burdison

INVENTORS:
Ralph Helm
John F. Helm
John R. Rowlands
By E. Laass, ATTORNEY (No Model.) 9 Sheets—Sheet 3.

R. & J. F. HELM & J. R. ROWLANDS.
MAILING MACHINE.

No. 556,747. Patented Mar. 24, 1896.

WITNESSES:
INVENTORS:
Ralph Helm
John F. Helm
John R. Rowlands
By E. Lass, ATTORNEY (No Model.) 9 Sheets—Sheet 8.
R. & J. F. HELM & J. R. ROWLANDS.
MAILING MACHINE.

No. 556,747. Patented Mar. 24, 1896.

WITNESSES:

INVENTORS:
Ralph Helm
John F. Helm
John R. Rowlands
By E. Lass
Their ATTORNEY

UNITED STATES PATENT OFFICE.

RALPH HELM, JOHN F. HELM, AND JOHN R. ROWLANDS, OF SYRACUSE, NEW YORK.

MAILING-MACHINE.

SPECIFICATION forming part of Letters Patent No. 556,747, dated March 24, 1896.

Application filed July 5, 1895. Serial No. 554,973. (No model.)

*To all whom it may concern:*

Be it known that we, RALPH HELM, JOHN F. HELM, and JOHN R. ROWLANDS, of Syracuse, in the county of Onondaga, in the State of New York, have invented new and useful Improvements in Mailing-Machines, of which the following, taken in connection with the accompanying drawings, is a full, clear, and exact description.

This invention consists in a novel construction of a machine designed to fold and inclose in wrappers newspapers, printed circulars, and other printed publications to be delivered through the mails, which machine performs said function in an expeditious manner and at a minimum expense of manual labor.

Figure 1:
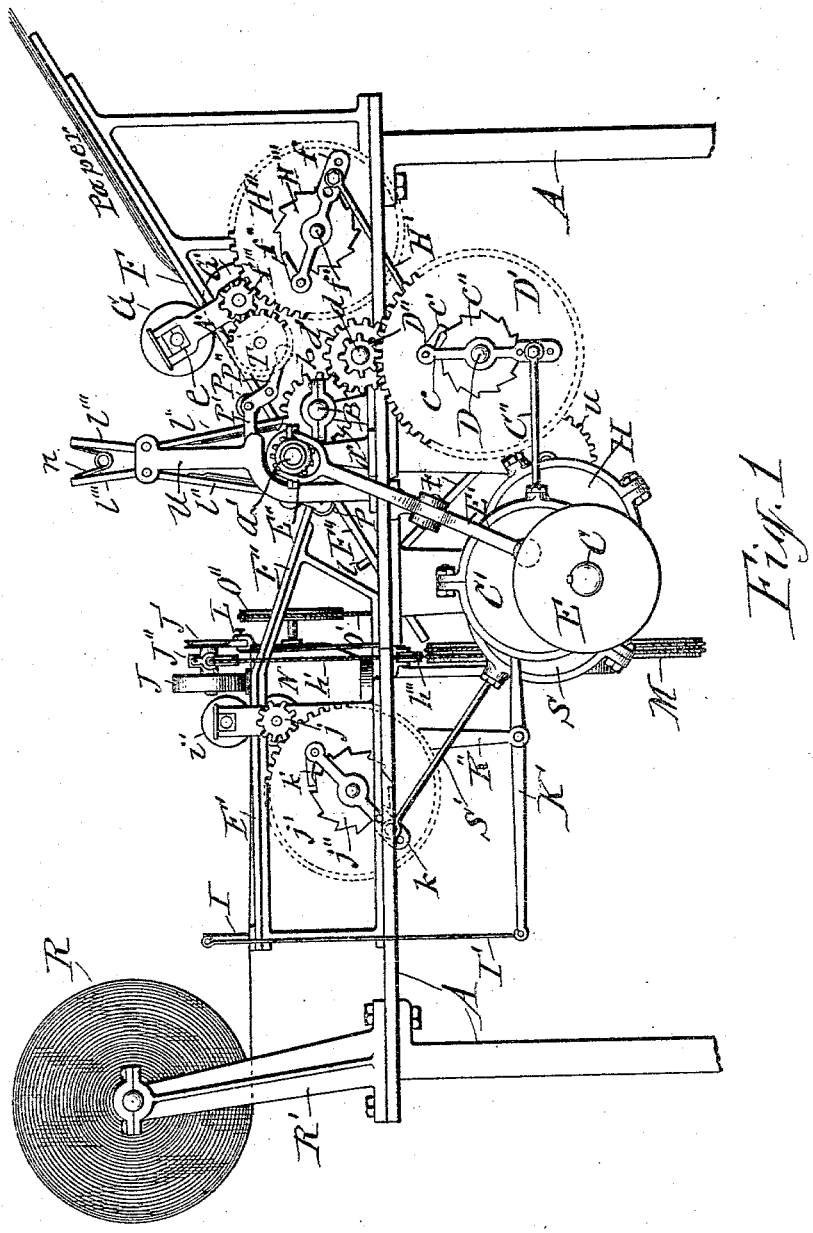
Figure 2:
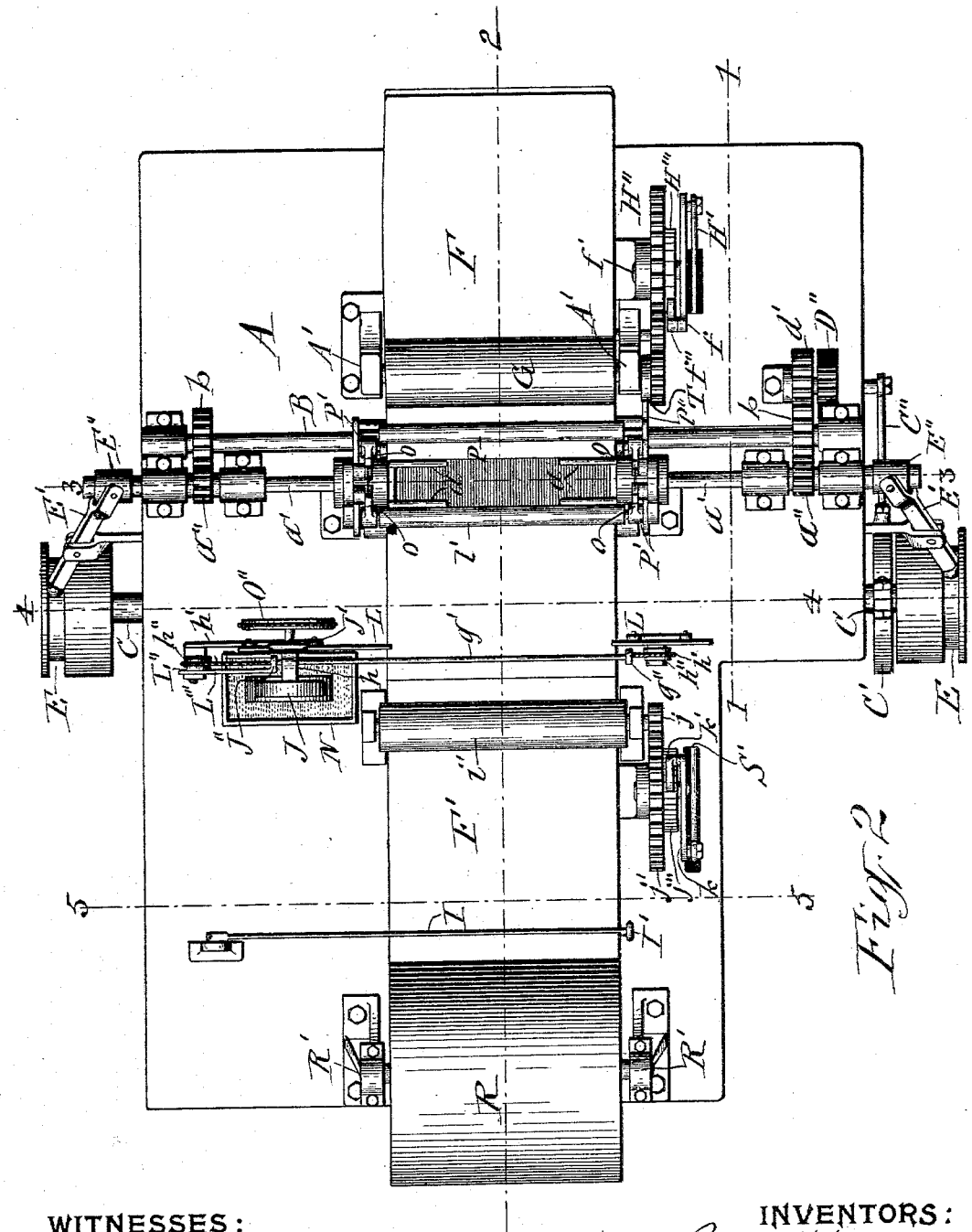
Figure 3:
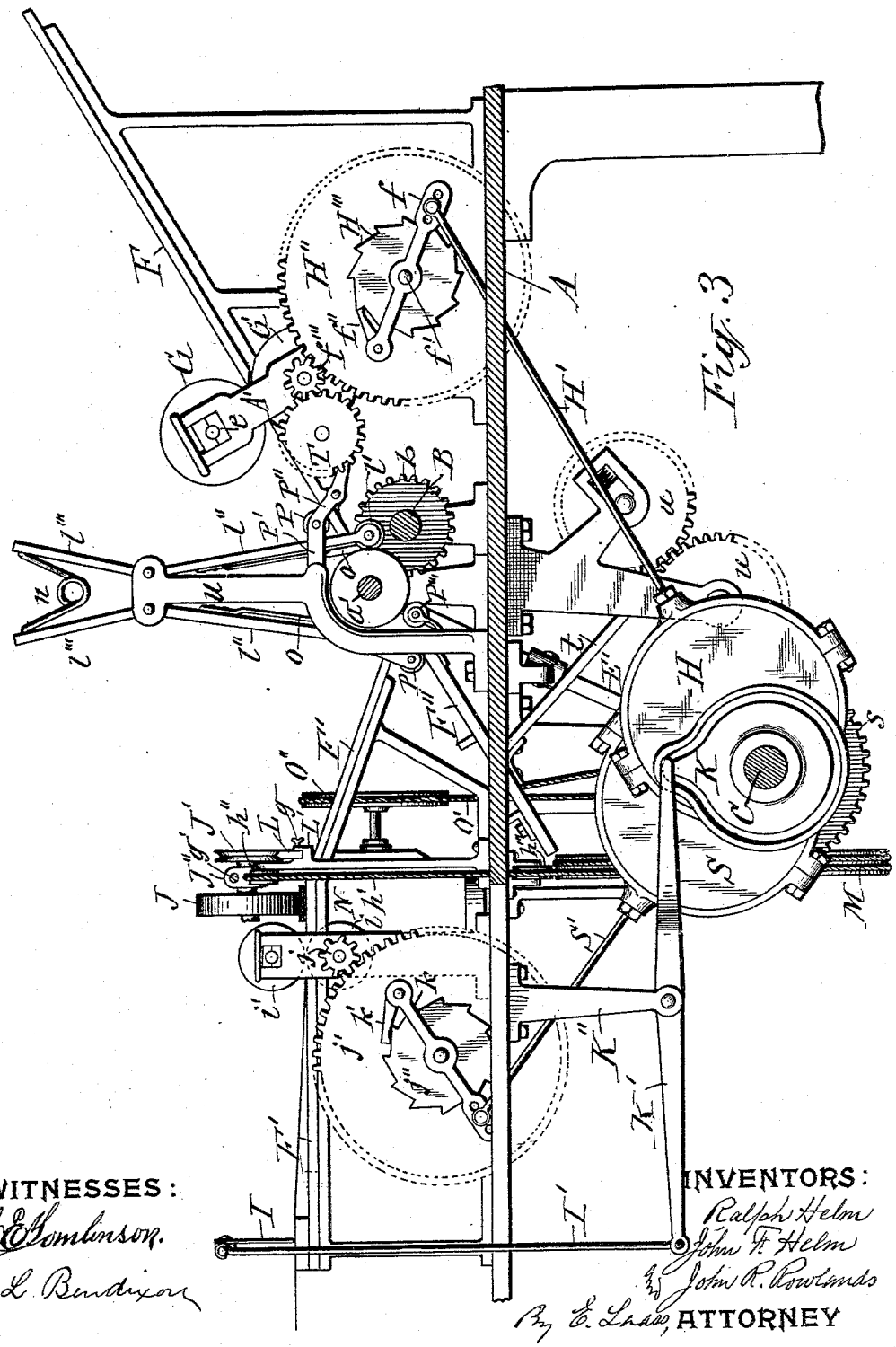
Figure 4:
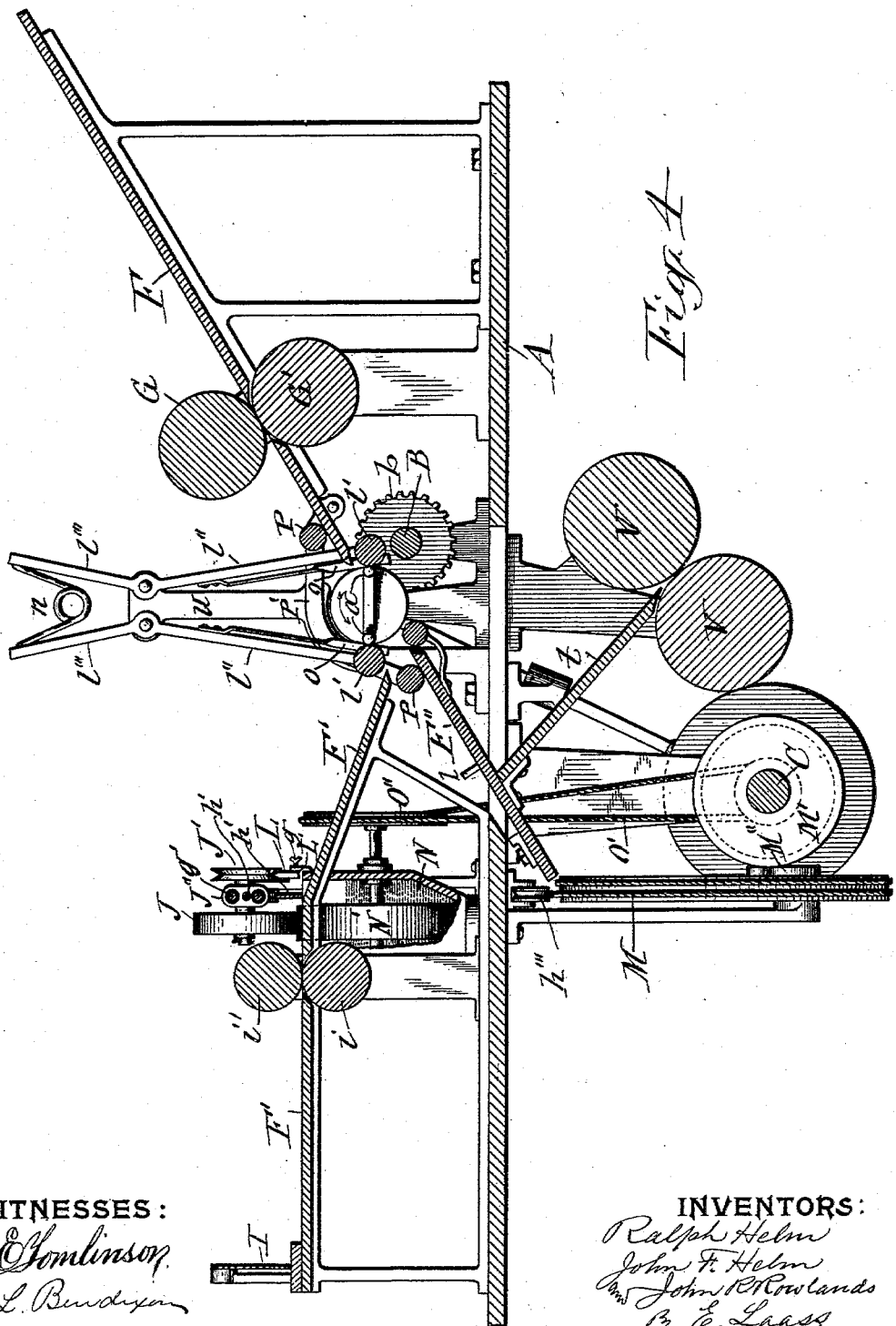
Figure 5:
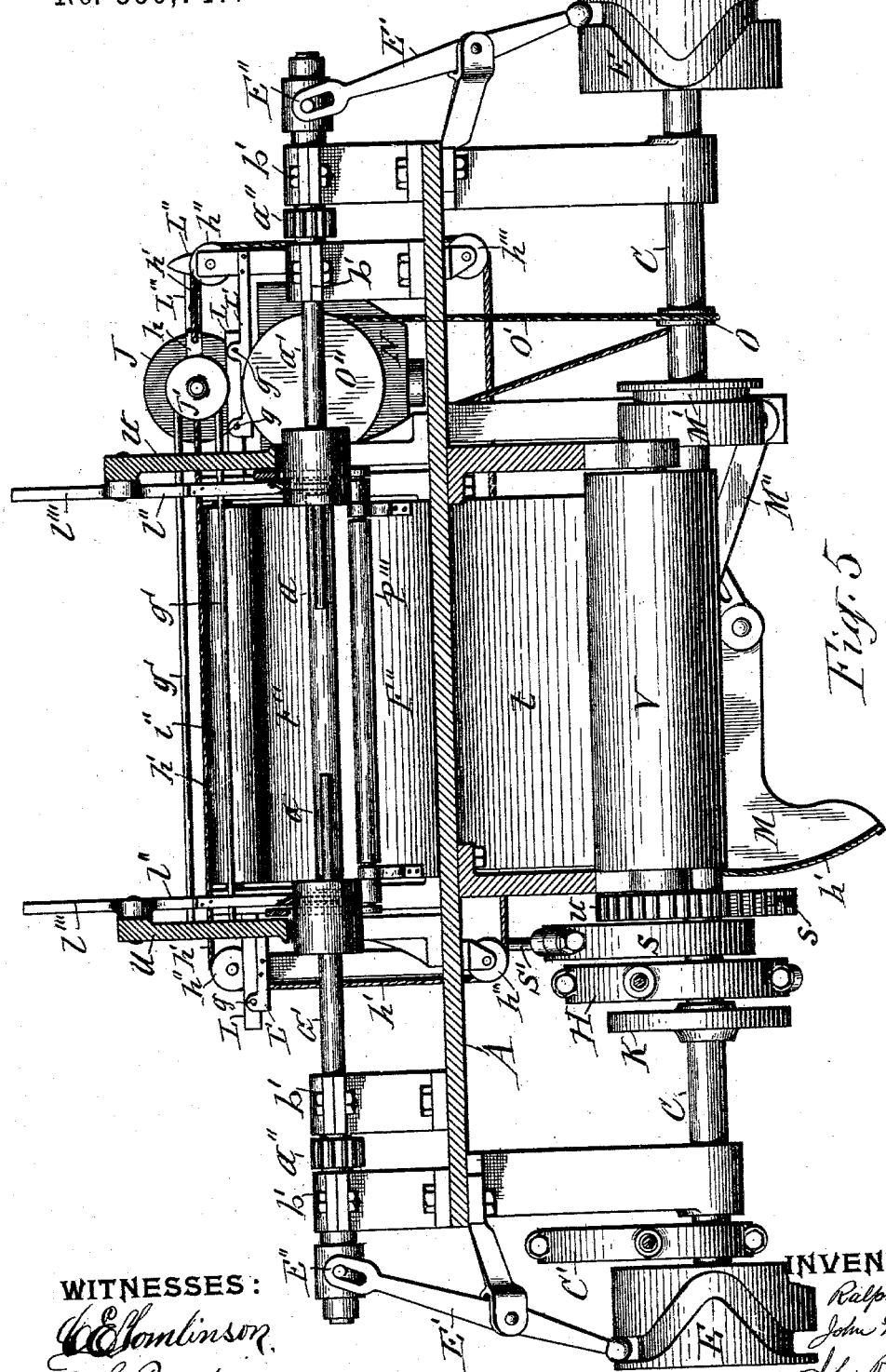
Figure 6:
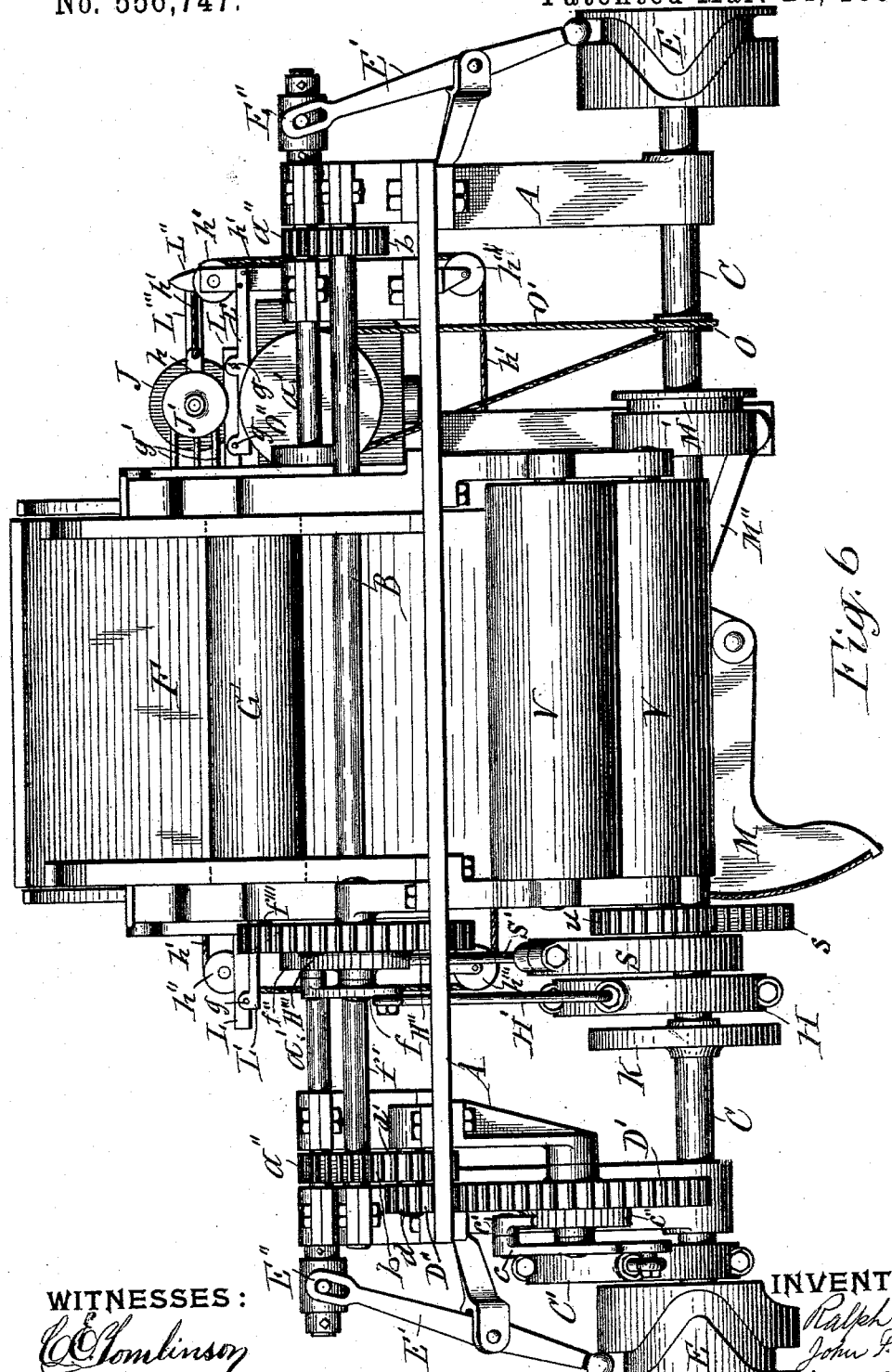
Figure 7:
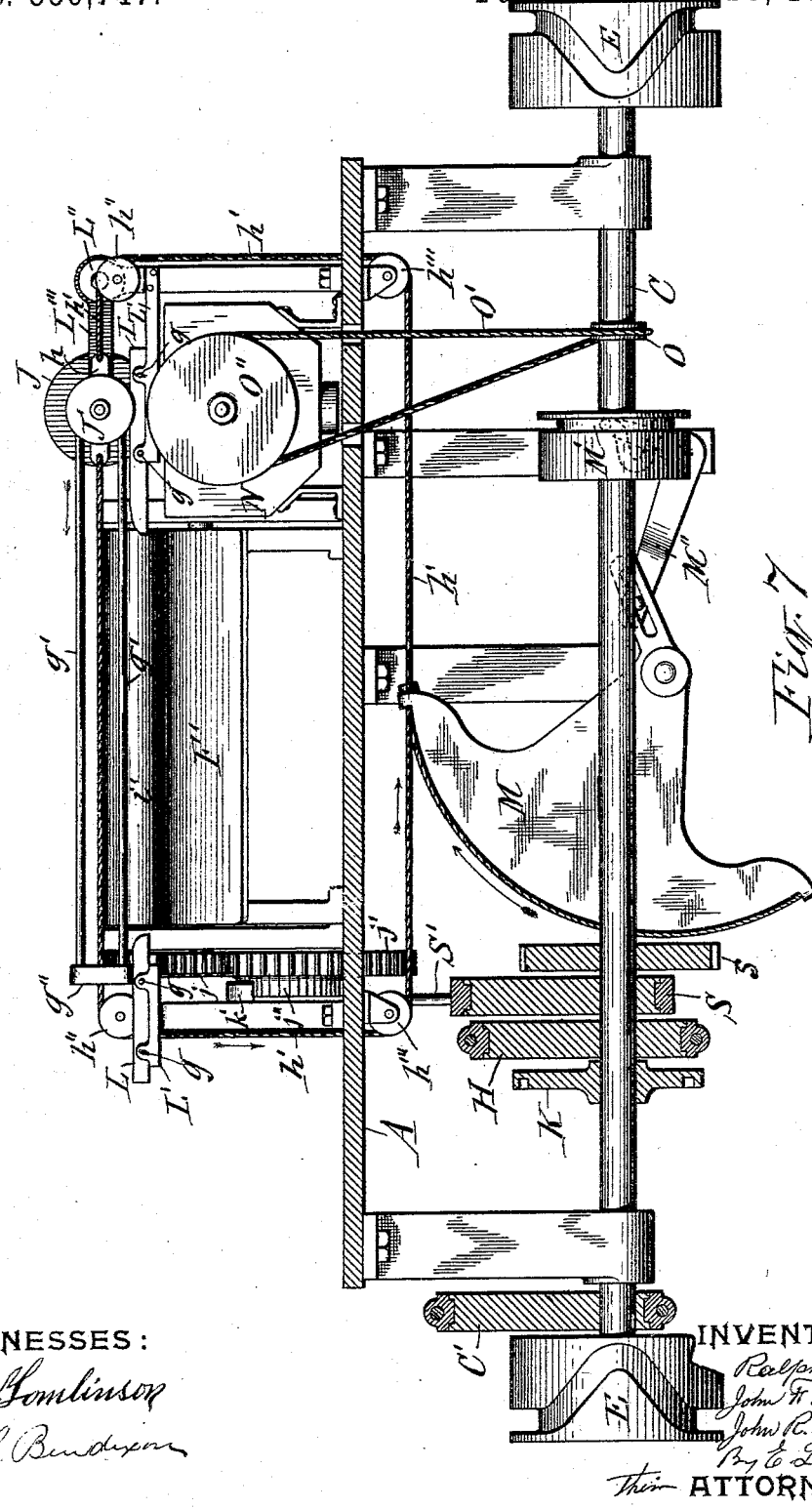
Figure 8:
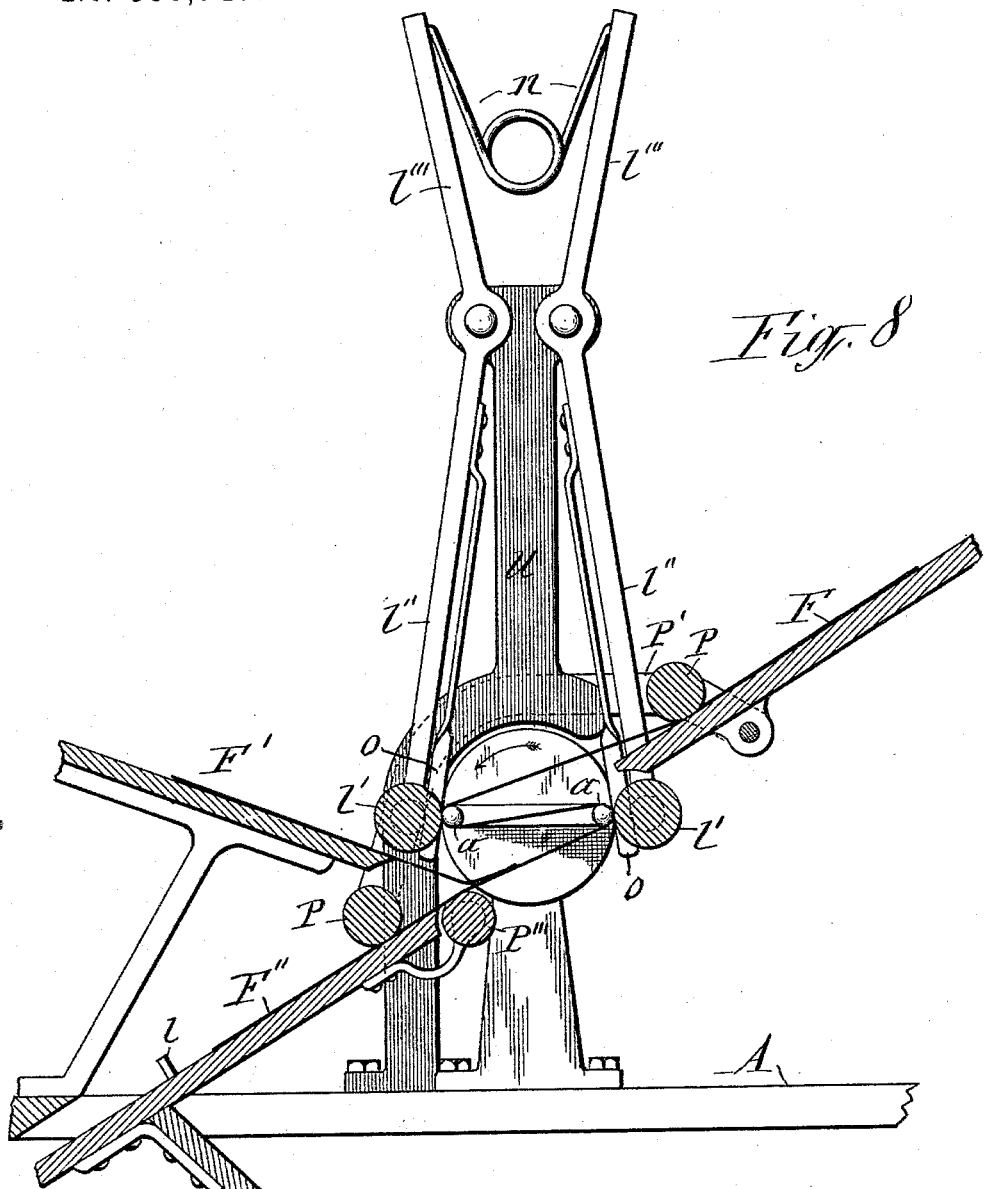
Figure 9:
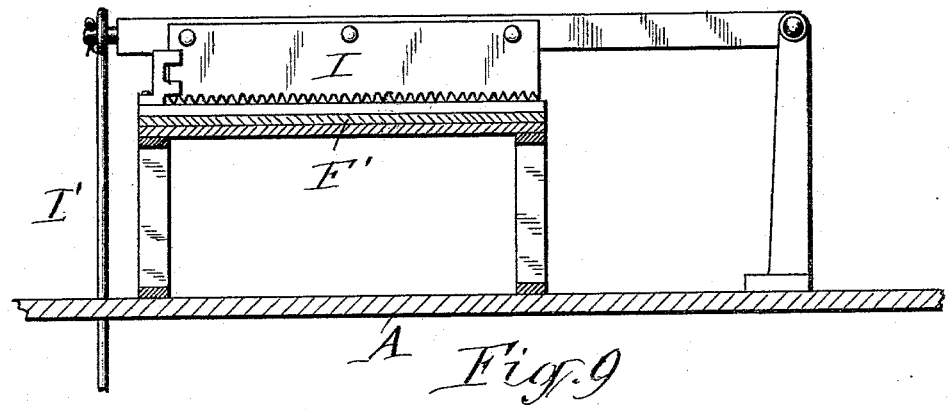
Figure 10:
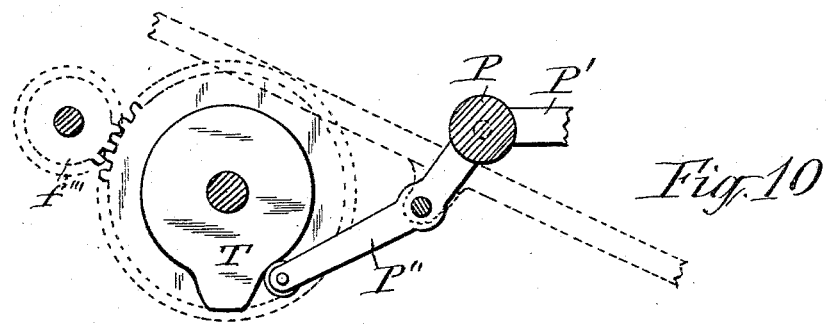
Figure 11:
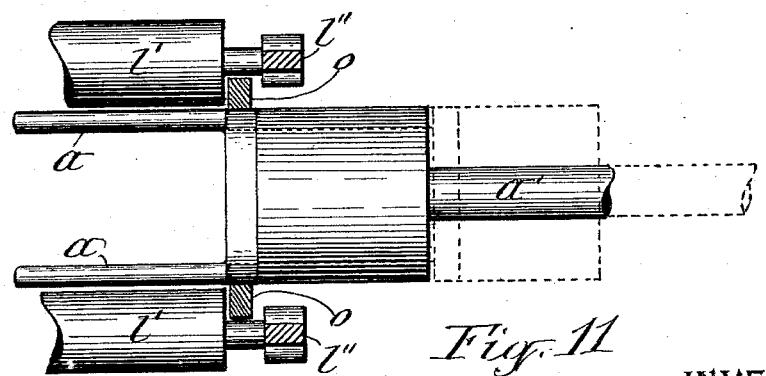

In the annexed drawings, Figure 1 is a side elevation of a machine embodying our invention. Fig. 2 is a plan view of the same. Figs. 3 and 4 are enlarged vertical longitudinal sections respectively on lines 1 1 and 2 2 in Fig. 2. Fig. 5 is an enlarged transverse section on line 3 3 in Fig. 2. Fig. 6 is an enlarged front view of the machine. Fig. 7 is an enlarged transverse section on line 4 4 in Fig. 2. Fig. 8 is an enlarged vertical transverse section of the paper-folding mechanism. Fig. 9 is a transverse section on line 5 5 in Fig. 2. Fig. 10 is an enlarged face view of the cam which actuates the paper-tension rollers to move to and from the feed-board and press upon the paper during the operation of folding the same, and Fig. 11 is a detail view of one of the paper-folding forks.

Similar letters of reference indicate corresponding parts.

A denotes the main supporting-frame of the machine, which frame may be of any suitable shape to accommodate the requisite mechanisms of the machine.

The paper-folding instrument consists mainly of fingers or tines $a\ a$ disposed parallel side by side and revolving on an axis in a line passing central between said fingers and parallel therewith. We preferably employ two pairs of said fingers or two forks arranged opposite each other and with the tines $a\ a$ of each fork sustained parallel to each other, pointing toward the tines of the other and in lines therewith. By employing said forks with their rigidly-attached tines we obviate the wear and tear incident to the loose joints of analogous devices employed for that purpose. Said forks are rotated in unison by pinions $a''\ a''$ of corresponding diameters mounted on the shafts $a'\ a'$ of the forks, as hereinafter described, and meshing with gears $b\ b$, which are also of corresponding diameters and secured to a rotary shaft B parallel with the axes of the forks.

Each of the shafts $a'$ is journaled to bearings $b'\ b'$ and movable longitudinally. The pinion $a''$ is loose on the shaft and confined between said bearings and connected to the shaft by spline and groove to permit transmission of rotary motion.

The forks are rotated intermittently by the following mechanism, viz: To the main driving-shaft C is secured an eccentric $C'$, the pitman $C''$ of which is connected to a lever $c$ provided with the pawl $c'$ and fulcrumed on a counter-shaft D parallel with the shaft C. To the said counter-shaft are attached a ratchet-wheel $c''$ and a gear-wheel $D'$, which latter meshes with a pinion $D''$ on another counter-shaft, $d$, which has also attached to it a gear-wheel $d'$ meshing with a pinion $d''$ fastened to the shaft B, hereinbefore referred to.

The movements of the described mechanisms are so timed as to hold the paper-folding forks intermittently at rest and during sufficient periods to permit the paper to be introduced between the tines $a\ a$ of each fork. The reciprocating motions are imparted to the said forks by means of cams E E, attached to the ends of the driving-shaft C and disposed reverse in relation to each other. To suitable supports on the frame A are pivoted the levers $E'\ E'$, which receive oscillatory motions from the aforesaid cams and are connected to the shafts $a'\ a'$ of the forks, as shown at $E''$.

F represents the feed-board upon which the paper to be folded is passed to the before-described forks. We preferably incline said feed-board toward the forks and arrange it with its delivery end so as to pass the paper between the tines of each fork. In order to control the feeding of the paper so as to pass it between the aforesaid tines while the forks are at rest, we employ the following feeding mechanism, viz:

On standards $A'\ A'$, erected on the sides of the feed-board F, are mounted the journalboxes $e$ of a drop-roller G, which normally rests upon the feed-board. Directly under the drop-roller is the feed-roller G', which is geared to rotate at predetermined intervals, said roller turning with the upper part of its periphery toward the before-described paper-folding forks. The mechanisms for imparting said intermittent motion to the feed-roller consist of the eccentric H, secured to the driving-shaft C and having its pitman H' connected to a lever $f$, pivoted to a stud $f'$, on which are mounted the spur-wheel H'' and ratchet-wheel H''', which wheels are fastened to each other. Said spur-wheel meshes with a pinion $f''''$ attached to the shaft of the feed-roller G'. To the lever $f$ is connected a pawl $f''$, which engages the ratchet-wheel H''', and by the reciprocating motion imparted to the pitman H' by the eccentric H the lever $f$ receives a rocking motion, which causes the pawl $f$ to intermittently turn the ratchet-wheel H''', which latter motion is transmitted to the feed-roller G' by the spur-wheel H'' and pinion $f''''$. At the opposite side of the paper-folding forks is another feed-board, F', the delivery end of which is also arranged to pass the sheet between the tines of the forks. This feed-board is employed for feeding to the folding-forks the wrapper which is to be applied to the folded paper. We preferably cut the wrapper from a continuous web put up in a roll R, which is pivoted to suitable supports R', as shown in Fig. 1 of the drawings.

I represents the perforating-blade which partly severs the wrapper from the aforesaid web. Said blade extends across the feed-board and is pivoted at one end to allow it to be moved vertically to and from the feed-board.

The mechanism for operating the blade is more clearly shown in Fig. 3 of the drawings and consists of the cam K, attached to the driving-shaft C and imparting a rocking motion to the lever K', pivoted to a support K'' on the main frame and connected by a rod I' to the free end of the blade.

Between the blade and paper-folding forks is arranged a suitable paster for applying to the rear end of the wrapper the necessary paste for fastening the wrapper around the folded paper. For this purpose we preferably employ the pasting-roller J, which is fastened to a journal affixed to a trolley J' of a smaller diameter than the said roller, so as to prevent said trolley from coming in contact with the wrapper during the operation of pasting the same.

At opposite sides of the feed-board F' are track-sections L L, which are in line with each other at right angles to the feed-board and in a plane above that of the feed-board, so that when the trolleys run onto said track-sections the pasting-roller is lifted from the plane of the feed-board.

To permit the track-sections to be adjusted so as to increase or diminish the distance between them and thus regulate the action of the pasting-roller for applying the paste on wrappers of different widths, we mount said track-sections on shoes L' L', on which they can be shifted longitudinally and then secured in their desired positions by set-screws $g$ $g$, connected to said shoes.

To a suitable fixed support L'' on the main frame is pivoted an arm L''', capable of moving vertically with its free end, which latter is formed with a yoke J'', to which are fastened the guide-rods $g'$ $g'$, extending across the feed-board parallel with the track-sections L L and united at their free ends by a cross-bar $g''$.

On the axle of the trolley and paste-roller is a yoke $h$, provided with eyes through which the aforesaid guide-rods pass, so as to sustain said trolley and roller in upright positions. To the said yoke is connected a cord or light chain $h'$, which extends in opposite directions therefrom and passes over sheaves $h''$ at opposite sides of the feed-board and thence down and around the under sides of sheaves $h'''$ and is fastened to a sector M, as more clearly shown in Fig. 7 of the drawings. Said sector is disposed vertically and pivoted to rock in a vertical plane, which motion is imparted to it by means of a cam M', attached to the driving-shaft C and actuating a bell-crank lever M'' connected to said sector. The rocking of this sector moves the trolley J', with the pasting-roller J, back and forth over the rear end of the wrapper lying upon the feed-board F'. At one side of the said feed-board is the paste-supplier, consisting of a paste-trough N, in which is a vertically-disposed roller N', receiving rotary motion from a pulley O attached to the driving-shaft and connected by a driving-belt O' to a pulley O'' attached to the outer protruding end of the shaft of the paste-supplying roller N', the roller J coming in contact with the roller N' and receiving therefrom the requisite coat of paste, which it subsequently spreads along the edge of the aforesaid wrapper during the travel of the pasting-roller across the feed-board.

The wrapper is fed to the paper-folding forks by means of a feed-roller $i$ directly under the feed-board F' and a drop-roller $i'$ over said feed-roller, which is located back of the aforesaid pasting devices, so as to keep said roller out of contact with the paste. This feed-roller receives intermittent rotary motion by means of a pinion $j$ attached to the shaft of said feed-roller and meshing with a spur-wheel $j'$, to the axis of which is fastened a ratchet-wheel $j''$. A lever $k$, pivoted to the same axis, has connected to it a pawl $k'$ engaging the ratchet-wheel. Said lever receives oscillatory motion from an eccentric S on the driving-shaft C by the eccentric-rod S' connected to the lever. The motion of the feed-roller $i$ is so timed as to cause it to push the partly-severed pasted portion of the web to the top of the lower end portion of the already partly-folded paper in time to allow it to be grasped in the succeeding folds of said paper, and as soon as this is effected the motion of the feed-roller $i$ is arrested, and thus the pasted wrapper is torn from the web by the tension on the wrapper.

The feed-board F' is composed of two sections, one of which is designated by the reference-letter F'' and extends from beneath the paper-folding forks and is parallel with the upper section, F. Across each of said sections lies a roller P, pivoted to arms P' at opposite sides of the feed-board, which arms are pivoted at one end to ears on the under side of the feed-board F, as clearly shown in Fig. 8 of the drawings. One of the said arms is formed with an extension P''', which engages a rotary cam T. (Shown in Fig. 10 of the drawings.) By means of this cam the arms P' are caused to intermittently rise from the feed-board to allow the paper to freely pass to the forks, by which it is subsequently folded, and when in position to be operated on by said forks the aforesaid cam allows the rollers P to drop onto the sheet and hold it in position under the necessary tension to allow it be folded tightly around the revolving forks.

P'''' is a roller which guides the folded paper to the chute $t$.

To the top of the lower feed-board section, F'', is attached a stop $l$ to arrest at the proper time the movement of the sheet in the operation of feeding the same to the folding-forks.

In order to cause the sheet to closely hug the tines of the forks during the folding operation, we place at opposite sides of the forks the rollers $l'\ l'$, which are parallel with the forks and pivoted to the lower ends of arms $l''\ l''$, pivoted in suspended positions to standards U erected on the frame A.

By means of springs $n$, interposed between upward extensions $l'''\ l'''$ of the aforesaid arms, the rollers $l'\ l'$ are pressed against the sides of the forks and caused to squeeze the paper against the tines during the operation of folding the paper and thus fold the same more compactly. During the latter part of this folding operation the wrapper is fed from the feed-board F' in time to insert the front marginal portion of the wrapper into the last fold of the paper and wind the wrapper around the folded paper. The squeezing-rollers $l'\ l'$ press the pasted end portion of the wrapper onto the main portion of the wrapper and thus fasten the same around the folded paper.

One of the great advantages of our machine consists in its expeditiously folding the paper by the revolving forks winding the paper from the center toward the ends thereof and thus folding the two end portions simultaneously.

To remove the folded paper with its inclosing wrapper from the forks, we employ the strippers $o\ o$, consisting of spring-arms preferably attached to the arms $l''\ l''$ and bearing with the free ends against the sides of the forks. In the longitudinal outward movement of these forks the aforesaid strippers engage the ends of the folded paper and hold the same until the tines of the forks are withdrawn therefrom, when the said paper drops onto a subsequent chute $t$, which conducts it to rollers V V, between which the folded paper passes, and is thus further compressed. Said compressing-rollers are geared directly to each other, as shown at $u\ u$ in Fig. 3 of the drawings, and receive rotary motion from a gear-wheel $s$ on the driving-shaft C.

The outward movements of the forks are so limited as to prevent the tines thereof from being drawn entirely out of contact with the strippers $o\ o$ and squeeze-rollers $l'\ l'$. In the inward movements of said forks they are turned to carry the tines in a horizontal plane in time to cause them to push said strippers and rollers out of the way of the heads of the forks.

What we claim as our invention is—

1. A paper-wrapping machine comprising rotary and longitudinally-movable paper-folding forks having their tines secured rigidly in parallel position, and spring-actuated paper-strippers bearing on the sides of the tines as set forth.

2. In combination with the rotary paper-folding forks, two feed-table sections respectively at opposite sides of the forks and in a plane passing between the tines of the forks as set forth.

3. In combination with the rotary paper-folding forks, two feed-table sections respectively at opposite sides of the forks and in a plane passing between the tines of the forks, and pressure-rollers over the two table-sections and bearing on the paper during the folding operation.

4. In combination with the rotary paper-folding forks two feed-table sections respectively at opposite sides of said forks and in a plane passing between the tines of the forks, intermittently-operating rock-arms at the side edges of the feed-table, and pressure-rollers extending across the top of the table-sections and pivoted to the rock-arms as set forth.

5. In combination with the rotary paper-folding forks and two feed-table sections respectively at opposite sides of said forks and in a plane passing between the tines of the forks, a shaft extending across the under side of the table-section and pivoted thereto, arms fastened to the ends of said shaft and extending to the other table-section, rollers extending across the respective table-sections and pivoted to the aforesaid arms, and an intermittently rotary cam actuating the rock-arms to carry the pressure-rollers to and from the feed-table sections as set forth and shown.

6. In combination with the rotary paper-folding forks and two paper-feed table-sections respectively at opposite sides of said forks and in a plane passing between the tines of the forks, and a wrapper-feed table leading to the top of one of the aforesaid table-sections adjacent to the paper-folding forks as set forth.

7. In combination with the rotary paper-folding forks and two paper-feed table-sections respectively at opposite sides of the forks and in a plane passing between the tines of the forks, a wrapper-feed table leading to the top of one of said table-sections, and paper-squeezers bearing on the sides of the tines as set forth.

8. In combination with the paper-folding forks and two paper-feed table-sections respectively at opposite sides of said forks and in a plane passing between the tines of the forks, a wrapper-feed table leading to the top of one of said table-sections adjacent to the forks, and pressure-rollers bearing intermittently on the feed-table sections as set forth.

9. In combination with the rotary paper-folding forks and paper-feed table-sections respectively at opposite sides of said forks and in a plane passing between the tines of the forks, pressure-rollers bearing intermittently on said table-sections, a wrapper-feed table leading to the top of one of the table-sections adjacent to the forks, and paper-squeezers bearing on the sides of the tines of the forks as set forth.

10. In combination with the rotary paper-folding forks and paper-feed table-sections respectively at opposite sides of the forks and in an inclined plane passing between the tines of the forks, feed-rollers respectively over and under the top of the upper table-section, arms pivoted at the side edges of said table-section and extending to the other table-section, rollers over said table-section and pivoted to said arms, a rotary cam rocking said arms to carry the rollers to and from the table-sections, paper-squeezers bearing on the sides of the tines of the forks and a wrapper-feed table leading to the lower table-section adjacent to the forks as set forth and shown.

11. The combination of two rotary shafts disposed in line with each other and movable longitudinally, mechanism imparting intermittent reciprocating motion to said shafts, forks attached to said shafts and disposed with the tines of each pointing toward the tines of the other, paper-feed table-sections respectively at opposite sides of the forks and in a plane passing between the tines, a wrapper-feed table leading to one of said table-sections adjacent to the forks, and strippers bearing on the ends of the folded paper and holding the same during the withdrawal of the forks therefrom as set forth.

12. The combination of two rotary shafts disposed in line with each other and movable longitudinally, mechanism imparting intermittent reciprocating motion to said shafts, forks attached to the shafts and disposed with the tines of each pointing toward the tines of the other, paper-feed table-sections respectively at opposite sides of the forks, a wrapper-feed table leading to one of said table-sections adjacent to the forks, paper-squeezers pressing against the sides of the tines and strippers engaging the ends of the folded paper and holding the same during the withdrawal of the forks therefrom substantially as set forth and shown.

13. In combination with the paper-folding forks and paper-feed table, a wrapper-feed table, a paste-supplier at one side of the latter table, and a pasting-roller traveling across the wrapper-feed table from and to the paste-supplier as set forth.

14. In combination with the paper-folding forks and paper-feed table, a wrapper-feed table, a paste-supplier at one side of the latter table, guides disposed transversely over the wrapper-feed table, a trolley on said guides and a pasting-roller attached to the axles of the trolley and carried thereby to and from the paste-supplier as set forth.

15. In combination with the driving-shaft, paper-folding forks, paper-feed table and wrapper-feed table, track-sections disposed in line with each other at opposite sides of the latter table and sustained longitudinally adjustable to vary the distance between the inner ends of said track-sections, a trolley traveling said track-sections, guides parallel with the track-sections and sustaining the trolley in upright position during its travel, a paste-supplier at one side of the wrapper-feed table, and a paste-roller connected to the axle of the trolley and carried thereby back and forth over the wrapper-feed table and to and from the paste-supplier as set forth.

16. In combination with the wrapper-feed table, track-sections at opposite sides of said table and slightly above the plane of the table and adjustable longitudinally to increase or diminish the distance between the track-sections vertically-yielding guides parallel with the track-sections, a yoke sliding on said guides, a trolley pivoted to said yoke traveling back and forth from one to the other of the track-sections, a pasting-roller attached to the axle of the trolley and a paste-supplier in the path of said roller.

17. In combination with the driving-shaft and wrapper-feed table, a pasting-roller traversing said table, sheaves at opposite sides of the table, a sector pivoted at its center, cords or chains running on the aforesaid sheaves and connected respectively to opposite ends of the sector and to the pasting-roller carriage, a cam on the driving-shaft, and a lever actuated by said cam and imparting oscillatory motion to the sector as set forth.

In testimony whereof we have hereunto signed our names this 24th day of June, 1895.

RALPH HELM. [L. S.]
JOHN F. HELM. [L. S.]
JOHN R. ROWLANDS. [L. S.]

Witnesses:
JOHN J. LAASS,
A. M. BENEDICT.